United States Patent
Baudelot et al.

(10) Patent No.: US 6,850,424 B2
(45) Date of Patent: Feb. 1, 2005

(54) INVERTER WITH A LINE-SIDE AND LOAD-SIDE FREEWHEELING PULSE CONVERTER USING SIC SWITCHING ELEMENTS

(75) Inventors: Eric Baudelot, Weisendorf (DE);
Albrecht Donat, Dachsbach (DE);
Bernhard Foecking, Erlangen (DE);
Hubert Schierling, Erlangen (DE);
Ralf Schweigert, Adelsdorf (DE);
Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/251,628

(22) Filed: Sep. 20, 2002

(65) Prior Publication Data
US 2003/0058662 A1 Mar. 27, 2003

(30) Foreign Application Priority Data
Sep. 21, 2001 (DE) .......................................... 101 46 527

(51) Int. Cl.⁷ ............................................. H02M 5/458
(52) U.S. Cl. .............................. 363/37; 363/40; 363/48
(58) Field of Search ............................. 363/34, 37, 39, 363/40, 47, 48

(56) References Cited

U.S. PATENT DOCUMENTS

| | | | | |
|---|---|---|---|---|
| 5,155,671 A | * | 10/1992 | Inaba et al. .................... | 363/37 |
| 5,315,497 A | * | 5/1994 | Severinsky .................... | 363/39 |
| 5,412,557 A | * | 5/1995 | Lauw ............................ | 363/40 |
| 5,859,770 A | * | 1/1999 | Takada et al. ............... | 363/132 |
| 5,905,642 A | * | 5/1999 | Hammond .................... | 363/39 |
| 6,005,787 A | * | 12/1999 | Mizukoshi .................... | 363/71 |
| 6,031,738 A | * | 2/2000 | Lipo et al. ..................... | 363/37 |
| 6,166,929 A | * | 12/2000 | Ma et al. ....................... | 363/40 |
| 6,301,130 B1 | * | 10/2001 | Aiello et al. ................... | 363/39 |
| 6,366,483 B1 | * | 4/2002 | Ma et al. ....................... | 363/37 |
| 6,434,019 B2 | * | 8/2002 | Baudelot et al. .............. | 363/16 |
| 6,690,592 B2 | * | 2/2004 | Link ............................. | 363/98 |
| 6,697,274 B2 | * | 2/2004 | Bernet et al. ............... | 363/132 |

OTHER PUBLICATIONS

Siemens catalog DA 65.10–2000 entitled, Simovert Masterdrives Vector Control, 1998/99.

* cited by examiner

Primary Examiner—Jeffrey Sterrett
(74) Attorney, Agent, or Firm—Henry M. Feiereisen

(57) ABSTRACT

An inverter includes a mains system side freewheeling pulse converter and a load-side freewheeling pulse converter, which are electrically connected on the DC side via a DC intermediate circuit. The mains system side and load-side freewheeling pulse converters each include switchable current valves in form of semiconductor switches that are made of silicon carbide with a high blocking voltage. The inverter can operate at higher voltages and frequencies, without affecting the load rating.

5 Claims, 1 Drawing Sheet

INVERTER WITH A LINE-SIDE AND LOAD-SIDE FREEWHEELING PULSE CONVERTER USING SIC SWITCHING ELEMENTS

CROSS-REFERENCES TO RELATED APPLICATIONS

This application claims the priority of German Patent Application, Serial No. 101 46 527.0, filed Sep. 21, 2001, pursuant to 35 U.S.C. 119(a)-(d), the disclosure of which is incorporated herein by reference.

BACKGROUND OF THE INVENTION

The present invention relates to an inverter with a mains system side and load-side freewheeling pulse converter, and more particularly to an inverter which can operate at higher pulse frequency and with a higher DC intermediate voltage than conventional inverters An inverter with freewheeling pulse converters on the mains system side and load-side, which are electrically connected on the DC side via a DC intermediate circuit, is commercially available. Inverters of this type are known, for example, from the Siemens catalog DA65.10.2000, entitled "Simovert Masterdrives Vector Control". In this Siemens catalog, the diagram "Reduction Curves for the Motor-Side Converter" show that under standard operating conditions the pulse frequency $f_{pL}$ is, for example, 6 kHz which can be increased to a maximum pulse frequency of $f_{pL}$ max=16 kHz. However, an increase in the pulse frequency $f_{pL}$ to 16 kHz reduces the current rating by 50%, which also reduces by 50% the power available from the converter.

The conventional inverter described above can keep feedback to the power mains system to a minimum. A power factor of one is set for the mains system side freewheeling converter, so that only active power is supplied by the power mains. A supply controlled in this fashion is also referred to as an Active Front End (AFE).

The conventional inverter has switchable semiconductor switches which are implemented as insulated gate bipolar transistors (IGBT) and made of silicon (Si). The electrical losses in Si-components increase superlinearly with the operating voltage, so that the maximum blocking voltage has to be optimized. When operating from a conventional line voltage, conventional inverters have typically a blocking voltage of 1200 V. However, switching losses limit the switching frequency. The switching frequency is typically between 3 and 8 kHz. This switching frequency makes it difficult to optimally dimension the line filter and/or the output filter of the inverter. n addition, the current for a predetermined power is determined by the maximum available voltage, which in turn determines the size of the motor cables.

It would be desirable and advantageous to provide an improved inverter with a higher voltage rating, in particular in the intermediate DC circuit.

SUMMARY OF THE INVENTION

According to one aspect of the present invention, an inverter has a freewheeling pulse converter on the mains system side and another freewheeling pulse converter on the load-side, which are electrically connected on their respective DC sides via a DC intermediate circuit. A line filter is connected to the AC input side of the freewheeling pulse converter. The switchable current valves of the mains system side and load-side freewheeling pulse converters are semiconductor switches made of silicon carbide and have a high blocking voltage.

Embodiments of the invention may include one or more of the following features. An output filter can be connected to the AC output side of the load-side freewheeling pulse converter to filter the higher pulse frequencies on the load-side. Because of the higher pulse frequencies, the output filter as well as the line filter of the inverter can be implemented as a single structural unit. Each of the switchable semiconductor switches can be implemented in silicon carbide as an insulated gate bipolar transistor (IGBT).

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
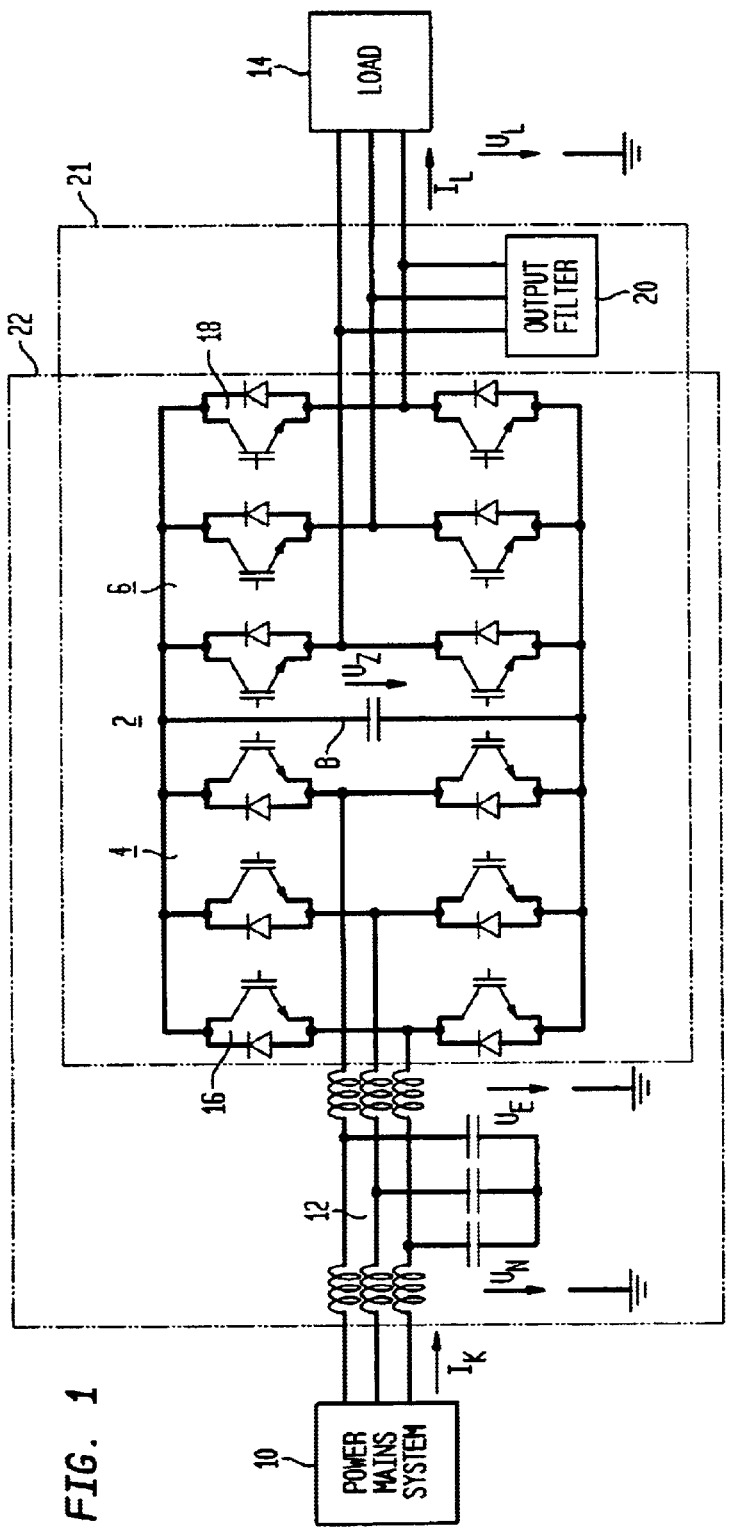
FIG. 1 shows schematically an inverter with freewheeling mains system side and load-side pulse converters in accordance with the present invention.

Throughout all the Figures, same or corresponding elements are generally indicated by same reference numerals.

FIG. 1 illustrates an inverter 2 with a mains system side pulse converter 4 and a load-side freewheeling pulse converter 6, which are electrically connected via a DC intermediate circuit 8. A line filter 12 is connected between a power mains system 10 and the AC terminals of the mains system side freewheeling pulse converter 4. Size and cost of the line filter 12 decrease with increasing pulse frequency $f_{pN}$, which is also referred to as operating frequency, of the mains system side freewheeling pulse converter 4. A load 14, in particular a three-phase motor, can be connected to the AC terminals of the load-side freewheeling converter 6. The mains system side freewheeling pulse converter 4 is controlled in such a way that the line current $i_N$ is almost free of harmonics. The remaining harmonics are filtered by the line filter 12. The exemplary mains system side freewheeling converter 4 of inverter 2 operates with a standard pulse frequency $f_{pL}$ of 6 kHz.

Figure 1A:
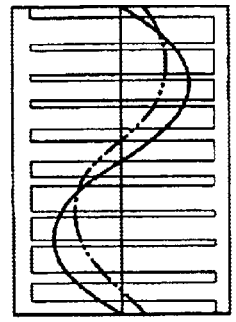
FIG. 1a shows schematically the line current $i_N$, line voltage $u_N$ and input voltage $u_E$ of the mains system side freewheeling pulse converter.

FIG. 1a shows one phase of a line current $i_N$, a line voltage $u_N$ and an input voltage $u_E$ of the mains system side freewheeling pulse converter 4 during one period of the line voltage. The mains system side freewheeling pulse converter 4 can also be controlled so that energy is fed back into the power mains 10. The load-side freewheeling pulse converter 6 is so controlled as to generate from the constant DC voltage $U_Z$, supplied to the input side, multiple phases of an AC voltage with changeable amplitude and frequency.

Figure 1B:
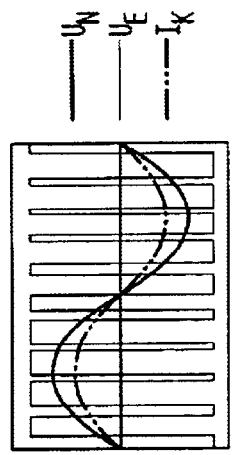
FIG. 1b shows schematically the load current $i_L$, load voltage $u_L$ and output voltage $u_L$ as well as the associated fundamental oscillation $u_{LG}$ of the load-side freewheeling pulse converter.

FIG. 1b shows one phase of a load current $i_L$, a load voltage $u_L$ and an output voltage $u_L$ as well as the associated fundamental oscillation $u_{LG}$. The mains system side power converter 4 has switchable current rectifier valves 16 and the load-side freewheeling pulse converter 6 has switchable current rectifier valves 18, with the switchable current rectifier valves 16, 18 implemented as insulated gate bipolar transistors, also referred to as IGBT.

In this inverter 2, which can be operate under various line conditions and/or can feed back power into the power mains 10, the line frequency $f_N$ and the output frequency $f_U$ of the inverter 2 are typically quite similar. A suitable design of the load-side freewheeling converter 6 requires that the ratio between the pulse frequency $f_{pL}$ of the converter 6 and the output frequency $f_U$ is always greater than a predetermined value.

By implementing the switchable current rectifier valves 16, 18 of the mains system side and load-side freewheeling pulse converters 4, 6, respectively, as semiconductor switches fabricated of silicon carbide with a high reverse voltage, the DC voltage $u_Z$ in the DC intermediate circuit 8 can be increased, without requiring a change in the number of current rectifier valves that are connected in series on the mains system side and load-side pulse converters 4, 6. This makes it possible to reduce the complexity and in particular the cross-section of the load-side cables, since for a predetermined power the current decreases with increasing voltage. Because the mains system side pulse converter 4 is a freewheeling pulse converter, the voltage in the DC intermediate circuit can be increased very easily. For this purpose, the mains system side freewheeling pulse converter 4 is operated as a rectifier and voltage upconverter. Silicon carbide also allows operation with a higher switching frequency, which significantly reduces feedback into the power mains 10 so that a smaller line filter 12 can be used with the inverter 2. The switching frequency and the voltage in the DC intermediate circuit 8 can be increased by making the semiconductor switch of the switchable current rectifier valve 16, 18 of the mains system side and load-side freewheeling pulse converters 4, 5 of the inverter 2 of silicon carbide, without increasing the losses.

According to an advantageous embodiment of the inverter of the invention, an output filter 20 is connected to the AC output side of the load-side freewheeling pulse converter 6. The size of the output filter 20 can be kept to a minimum by increasing the switching frequency of the switchable current rectifier valves 18 of the freewheeling load-side pulse converter 6, so that the output filter 20 can be integrated in the inverter, as indicated by the box 21. The line filter 12 can also be intearated in the inverter, as indicated by the box 22. The optimized output filter also significantly improves the sinusoidal output voltage characteristic of the load-side converter 6. This improvement reduces the stress on the load, which makes it unnecessary to change the isolation of the load when increasing the voltage in the DC intermediate circuit 8. Characteristic frequencies of the system are also no longer excited, thus eliminating shielded cables between the output of the load-side current rectifiers and the input terminals of the load, which facilitates handling for an end-user. The project specification for the cable runs between the load-side current rectifier and load are also simplified or eliminated altogether.

By using semiconductor switches made of silicon carbide for the switchable current rectifier valves 16, 18 of the mains system side and load-side freewheeling converters 4, 6 of the inverter 2 with a DC intermediate circuit 8, the rated load 14 can be maintained even with a higher voltage of the DC intermediate circuit 8 of the inverter 2. The inverter 2 has a reduced feedback to the environment and likewise a reduced feedback from the environment to the converter, which simplifies applications of the inverter for an end-user.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An inverter, comprising
    a mains system side freewheeling pulse converter having a DC side;
    a load-side freewheeling pulse converter having a DC side;
    a DC intermediate circuit for electrically connecting the DC side of the mains system side freewheeling pulse converters and the DC side of the load-side freewheeling pulse converter; and
    a line filter connected to an AC input side of the mains system side freewheeling pulse converter,
    wherein each of the mains system side and load-side freewheeling pulse converters includes switchable current valves in the form of semiconductor switches made of silicon carbide and have a high blocking voltage.

2. The inverter of claim 1, and further comprising an output filter connected with an AC output side of the load-side freewheeling pulse converter.

3. The inverter of claim 2, forming with the output filter a structural unit.

4. The inverter of claim 1, forming with the line filter a structural unit.

5. The inverter of claim 1, wherein the switchable semiconductor switches are implemented as insulated gate bipolar transistors.

* * * * *